US007109146B2

(12) United States Patent
Tani et al.

(10) Patent No.: US 7,109,146 B2
(45) Date of Patent: Sep. 19, 2006

(54) IMAGE RECEIVING MATERIAL FOR ELECTRONIC PHOTOGRAPH

(75) Inventors: Yoshio Tani, Fujinomiya (JP); Fujio Kakimi, Minamiashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/970,810

(22) Filed: Oct. 5, 2001

(65) Prior Publication Data

US 2002/0068165 A1 Jun. 6, 2002

(30) Foreign Application Priority Data

Oct. 6, 2000 (JP) ............................ 2000-306997

(51) Int. Cl.
*B41M 5/20* (2006.01)
*B32B 5/16* (2006.01)

(52) U.S. Cl. ...................... 503/227; 428/327; 428/341; 428/323

(58) Field of Classification Search ................ 428/323, 428/327, 328, 329, 331, 340, 341
See application file for complete search history.

(56) References Cited

U.S. PATENT DOCUMENTS

| | | | | |
|---|---|---|---|---|
| 5,747,415 | A * | 5/1998 | Campbell et al. | 503/227 |
| 5,891,827 | A * | 4/1999 | Brust et al. | 503/227 |
| 6,165,606 | A * | 12/2000 | Kasahara et al. | 428/323 |
| 6,347,866 | B1 * | 2/2002 | Sunderrajan et al. | 347/100 |

FOREIGN PATENT DOCUMENTS

| | | | |
|---|---|---|---|
| CA | 2158321 | A1 | 3/1996 |
| JP | 08-211645 | A | 8/1996 |
| JP | 2000-010327 | A | 1/2000 |

OTHER PUBLICATIONS

MAchine translation of JP 2000-010327, Jan. 2000, Tamagawa et al.*
Machine translation of JP08-211645, Aug. 1996, Ebisch et al.*
Japanese Office Action dated Dec. 14, 2005.

* cited by examiner

*Primary Examiner*—Holly Rickman
(74) *Attorney, Agent, or Firm*—Sughrue Mion, PLLC

(57) ABSTRACT

The present invention discloses an image receiving material for electronic photograph comprising a support made of base paper having a thermoplastic resin layer on each side of the support; a toner receiving layer, provided on one side of said support, which contains a thermoplastic resin; and one or more back layers provided on the other side of said support, wherein thermoplastic resin, porous particles and a cationic material are contained in any one of said back layers. Such image receiving material for electronic photograph of the present invention has a right side which is excellent in glossiness and thus allows electronic photographic image full of photographic touch to be formed thereon, and a back side having desirable printability for both of electronic photographic image and ink-jet printed image.

21 Claims, No Drawings

IMAGE RECEIVING MATERIAL FOR ELECTRONIC PHOTOGRAPH

FIELD OF THE INVENTION

The present invention relates to an image receiving material for electronic photograph where an electronic photographic image full of photographic touch can be printed on one side of the image receiving material, and either of electronic photographic image and an ink-jet printed image is desirably printable on the other side of the image receiving material.

RELATED ART

Electronic photograph process, characterized by its dry nature, high printing speed and applicability to general-purpose papers (plain paper or wood-free paper), is widely applied to copying machines or output devices of personal computers.

Outputting photographic image such as human face or landscape onto plain paper is, however, not satisfactory in particular in terms of glossiness and real photographic touch. Thus there has been a strong need for a paper specialized for photographic purpose. Japanese Laid-Open Patent Publication Nos. 4-212168 and 8-211645 disclose an image receiving material for electronic photograph aiming at improving the glossiness, which comprises a support and a toner receiving layer formed thereon containing a thermoplastic resin. An approach for further improving the photographic touch relates to a sheet-type image receiving material for electronic photograph as disclosed in Japanese Laid-Open Patent Publication No. 8-21164, in which thermoplastic resin layers are provided on both sides of a base paper.

More recently, as the purpose of use of such image receiving material for electronic photograph diversifies, there are increasing opportunities for printing electronic photographic images on both sides of the material, or printing an electronic photographic image on the right side and printing using an ink-jet printer an image or text (postcard address, etc.) on the back side. So that there is a demand for an excellent printability of both of electronic photographic image and ink-jet printed image on the back side of the image receiving material. Printing on both sides of the image receiving material which has a support coated with thermoplastic resin on both sides thereof, however, will generally fail in obtaining a desirable ink-jet printed image, since the support is not a good ink absorber or rather poor in drying property and water-proof property. There has thus been a strong demand for improving printability of, in particular, the back side.

Considering the above problems in the prior art, it is therefore an object of the present invention to provide an image receiving material for electronic photograph, which has a right side excellent in glossiness and thus allows electronic photographic image full of photographic touch to be formed thereon, and a back side having desirable printability for both of electronic photographic image and ink-jet printed image. In particular, emphasis was placed on providing the back side with suitability for printing using an ink-jet printer (more specifically, drying property, water-proof property and sharpness of printed image).

SUMMARY OF THE INVENTION

The present inventors found out after extensive investigations that use of predetermined materials in the back layer will successfully provide an image receiving material for electronic photograph which can attain the objects of the invention.

That is, the present invention provides an image receiving material for electronic photograph comprising a support made of base paper having a thermoplastic resin layer on each side of the support; a toner receiving layer, provided on one side of said support, which contains a thermoplastic resin; and one or more back layers provided on the other side of said support, wherein thermoplastic resin particles, porous particles and a cationic material are contained in any one of said back layers. The porous particles used in the present invention are preferably an inorganic particles and/or polymer particles.

DETAILED DESCRIPTION OF THE INVENTION

The image receiving material for electronic photograph of the present invention will be detailed hereinafter. It should now be noted that, in this specification, any connective notation using a word "to" indicates a range defined by values placed before and after such word, where both ends of such range are included as minimum and-maximum values.

1) Base Member

1-1) Constitution of Base Member

The support used for the image receiving material of the present invention is composed so that thermoplastic resin layers are provided on both sides of a base paper. Each of the thermoplastic resin layers provided on both sides may be composed of a single layer or a plurality of layers. The support used in the present invention may be such that being composed of a base paper having laminated on both ides thereof bases provided with thermoplastic resin layers.

The support is preferably has a sheet form and the thickness thereof generally ranges from 25 μm to 300 μm, more preferably from 50 μm to 260 μm, and still more preferably from 75 μm to 220 μm or around. The stiffness of the support can properly be adjusted depending on production processes of the image receiving material for electronic photograph or purpose of the use, and the preferable range thereof is not specifically limited. When the image receiving material for electronic photograph is intended for use as an image receiving paper for photographic images, it is preferable to use a support equivalent to that used for color silver salt photograph.

From the viewpoint of fixation property, the support used in the present invention preferably has a heat conductivity at 20° C. and under a relative humidity of 65% of 0.50 kcal/m·h·° C. or above. The heat conductivity can be measured according to a method described in Japanese Laid-Open Patent Publication No. 53-66279 using a transfer paper having a water content adjusted in compliance with JIS P-8111. The density of the support is preferably 0.7 $g/cm^3$ or above again from the viewpoint of the fixation property.

Any layers composing the support used in the present invention may contain various additives properly selected provided that they do not obstruct the purpose of the present invention. For example, a brightener; electro-conductive agent; filler; pigments such as titanium oxide, ultramarine blue and carbon black; and dyes may be contained as occasion demands.

One side or both sides of the support used in the present invention can be subjected to a variety of surface treatment or undercoating in order to improve the adhesiveness to any layers provided thereon. Examples of such surface treatment include embossing fine particles, matt or silk fabric-like pattern as disclosed in Japanese Laid-Open Patent Publication No. 55-26507; and activation treatment such as corona discharge treatment, flame treatment, glow discharge treatment and plasma treatment. The undercoating is exemplified as a method disclosed in Japanese Laid-Open Patent Publication No. 61-846443. Such treatments can be effected independently or in arbitrary combinations. As for the combined use, embossing can be followed by activation treatment, or the surface treatment such as activation treatment be followed by undercoating.

The outermost layers on both sides of the support used in the present invention may be coated with an antistatic agent which is typified by semiconductor metal oxide such as alumina sol and tin oxide, or carbon black, all of which being dispersed in a hydrophilic binder. More specifically, a support disclosed in Japanese Laid-Open Patent Publication No. 63-220246 is available.

The support used in the present invention is preferably such that being durable against fixation temperature, having satisfactory levels of whiteness, slipping property, friction property and antistatic property, and being less causative of dimple formation after fixation.

1-2) Base Paper

The base paper composing the image receiving material for electronic photograph of the present invention preferably has a center-line average roughness of 0.01 μm to 5 μm, more preferably 0.05 μm to 3 μm, and still more preferably 0.1 μm to 1.5 μm. The base paper having a center-line average roughness of 0.01 μm to 5 μm is preferably such that being made of pulp fiber and having a fiber length distribution as disclosed in Japanese Laid-Open Patent Publication No. 58-68037 (that is, sum of residual portions on a 24-mesh screen and a 42-mesh screen amounts 20 wt % to 45 wt %, and a residual portion on a 24-mesh screen amounts 5 wt % or less). It is also preferable to treat the surface by applying heat and pressure in machine calendering or super calendering.

Materials for the base paper used in the present invention can properly be selected from known materials of base paper for such support. Examples of the base paper those mainly composed of natural pulp having coniferous or broad-leaved origin and is added, if necessary, with filler such as clay, talc, calcium carbonate and urea resin particles, sizing agent such as rosin, alkenylketene dimer, higher aliphatic acid, epoxy-modified aliphatic amide, paraffin wax and alkenylsuccinic acid, paper reinforcing agent such as starch, polyamide-polyamine epichlorohydrin and polyacrylamide, and fixing agent such as aluminum sulfate and cationic polymer; those composed of synthetic pulp typically made of polyethylene or polypropylene; those produced by mixed paper making using natural pulp and synthetic pulp; and those produced by combining layers of natural pulp and synthetic pulp.

The basis weight of the base paper is preferably 50 to 250 $g/m^2$, and more preferably 100 to 180 $g/m^2$. The thickness of the base paper is preferably 50 to 250 μm, and more preferably 100 to 180 μm. Papers available in general relate to papers and synthetic polymer films described in "Sashin Kogaku no Kiso -Gin'en Shashin Hen- (The Elements of Photographic Engineering -Silver Photograph Series-)", edited by Society of Photographic Science and Technology of Japan, published by Corona Publishing Co., Ltd. p. 223–240 (1979). Specific examples thereof include synthetic paper (those of polyolefin-base, polystyrene-base, etc.); wood-free paper; art paper; (duplex) coated paper; (duplex) cast coated paper; mixed paper made of synthetic resin pulp such as polyethylene pulp and natural pulp; Yankee paper; baryta paper; wall paper; lined paper; synthetic resin—or emulsion-immersed paper; synthetic rubber latex-immersed paper, internally synthetic resin-added paper; paper board; cellulosic fiber paper; polyolefin coated paper; paper support typified by those coated with polyethylene on both sides; films or sheets made of various plastics such as polyolefin, polyvinyl chloride, polyethylene terephthalate, polystyrene methacrylate, polyethylene naphthalate, polycarbonate-poly-vinyl chloride, polystyrene, polypropylene, polyimide and celluloses (e.g., triacetyl cellulose); papers or sheets made of such plastics and subjected to whitening processing to raise the reflectivity (e.g., immersion of titanium oxide into the film); cloth; metal and glass. These materials may be used independently or may be used as a base paper laminated on one side or both sides thereof using a synthetic polymer such as polyethylene. Any stack based on an arbitrary combination of the foregoing base papers may be acceptable. Still other examples of available base paper relate to support s described in Japanese Laid-Open Patent Publication No. 62-253159, p. 29–31, ditto No. 1-61236, p. 14–17, ditto No. 63-316848, ditto No. 2-22651, ditto No 3-56955 and U.S. Pat. No. 5,001,033.

In the present invention, it is preferable to treat the base paper with the aid of corona discharge, flame, glow discharge or plasma before the base paper is coated on both sides thereof with thermoplastic resin 1-3) Thermoplastic Resin Layer Provided on Both Sides of Base Paper In the present invention, the materials specifically listed below are available for the thermoplastic resin layer provided on both sides of the base paper, while being not limited thereto.

Thermoplastic resins available for the image receiving material for electronic photograph of the present invention include resins having ester bond; polyurethane resin; polyamide resin, urea resin and analogues thereof; polysulfone resin; polyvinyl chloride resin, polyvinylidene chloride resin, vinyl chloride-vinyl acetate copolymer, vinyl chloride-vinyl propionate copolymer and analogues thereof; polyol resin such as polyvinyl butylal; cellulosic resins such as ethyl cellulose and cellulose acetate; polycaprolactone resin, styrene-maleic anhydride resin, polyacrylonitrile resin, polyether resin, epoxy resin, phenol resin and analogues thereof; polyolefin resins such as polyethylene resin and polypropylene resin, copolymer comprising an olefin such as ethylene and propylene with other vinyl monomer, acrylic resin and analogues thereof; and mixtures or copolymers thereof.

Among such thermoplastic resin, polyolefin resin and ester-bond-containing resin are preferably used.

While the polyolefin resin is generally produced using a low-density polyethylene, it is preferable from the viewpoint of raising heat resistance of the support to use polypropylene or a blended material of polypropylene and polyethylene, high-density polyethylene, and a blended material of high-density polyethylene and low-density polyethylene. In particular from the viewpoint of the cost and lamination suitability, using a blended material of high-density polyethylene and low-density polyethylene is most preferable. The blended material or high-density polyethylene and low-density polyethylene is preferably used at a blend ratio (weight basis) of 1/9 to 9/1 in general, more preferably 2/8 to 8/2, and still more preferably 3/7 to 7/3. The back-side polyolefin layer is generally formed using high-density polyethylene or a blended material of high-density polyethylene and low-density polyethylene. There is no specific limitation on the molecular weight of the polyethylene, where preferable one has a melt index of 1.0 to 40 g/10 minutes for both of high-density polyethylene and low-density polyethylene, and is suitable for extrusion.

The ester-bond-containing resin can be exemplified by polyacrylic ester resins such as polymethyl acrylate, polybutyl acrylate, polymethyl methacrylate and polybutyl methacrylate; or polymethacrylate ester resin, polyester resin, polycarbonate resin, polyvinyl acetate resin, styrene acrylate resin, styrene-methacrylate ester copolymer, vinyltoluene acrylate resin and analogous thereof.

The foregoing polyester resin is obtained by condensation of a polycarboxylic acid component and a polyalcoholic component, where the former includes terephthalic acid, isophthalic acid, fumaric acid, phthalic acid, adipic acids sebacic acid, azelaic acid, abietic acid, succinic acid, trimellitic acid and pyromellitic (all of which may be substituted by sulfonic acid groups or carboxyl groups), and the latter includes ethyleneglycol, diethyleneglycol, propyleneglycol, bisphenol-A, diether derivative of bisphenol-A (e.g., ethylene oxide diadduct of bisphenol-A, polypropylene diadduct of bisphenol-A), bisphenol-S, 2-ethylcyclohexane dimethanol, neopentylglycol, cyclohexane dimethanol and glycerin (all of which may be substituted by hydroxyl groups).

Specific examples thereof can be found in Japanese Laid-Open Patent Publication Nos. 59-101395, 63-7971, 63-7972, 63-7973 and 60-294862. Commercially available products include Vylon 290, Vylon 200, Vylon 280, Vylon 300, Vylon 103, Vylon GK-140 and Vylon GK-130 produced by Toyobo Co., Ltd., Tuftone NE-382, Tuftone U-5, ATR-2009 and ATR-2010 produced by Kao Corporation, Elitel UE3500, UE3210 and XA-8153 produced by Unitika, Ltd., and Nichigo Polyester TP-220, and R-188 produced by Nippon Synthetic Chemical Industry Co., Ltd.

The thermoplastic resin layer composing the image receiving material for electronic photograph of the present invention may have a single-layered structure or multi-layered structure.

The thickness of the thermoplastic resin layer generally ranges from 5 to 100 μm or around, and more preferably 15 to 50 μm or around. The thermoplastic resin layers on both sides may be identical or different from each other in terms of the components, physical properties, thickness and constitution.

The right side of the thermoplastic resin layer may have a glossy appearance, or may embossed with fine particles, matt or silk fabric-like pattern as disclosed in Japanese Laid-Open Patent Publication No. 55-26507. For the case an electro-conductive layer is formed on the right side, the outermost layer on the opposite side (back side) may have a non-glossy embossed pattern. Such embossed surface may further be activated by corona discharge treatment, flame treatment or the like, which may be followed by undercoating as described in Japanese Laid-Open Patent Publication No. 61-846443.

The thermoplastic resin layer may be added with properly-selected various additives provided that the purpose of the present invention is not adversely affected.

2) Layer Constitution of Image Receiving Material for Electronic Photograph

The image receiving material for electronic photograph of the present invention comprises a support made of base paper having individually on both sides thereof a thermoplastic resin layer; a toner receiving layer, provided on one side of the support, which contains at least a thermoplastic resin; and at least one back layer provided on the other side of the support. So far as at least such layer constitution is included, the image receiving material for electronic photograph of the present invention may have other layers. For example, surface protecting layer, intermediate layer, undercoat layer, cushion layer, charge controlling (preventive) layer, reflective layer, color control layer, storability improving layer, adhesion preventive layer anti-curling layer or smoothing layer may be properly be provided depending on purpose or mode of the use. Each of such layers may also be composed of two or more sub-layers.

For the case that the image receiving material for electronic photograph is composed as a transparent one in which the toner receiving layer is provided on a transparent support, it is preferable that also the individual layers provided on both sides of the support are transparent.

On the other hand, for the case that the image receiving material is composed as a reflective one in which the toner receiving layer is provided on a reflective support, the individual layers provided on the right side of the support are not necessarily be transparent, or rather white color is preferred. The brightness measured according to the method defined in JIS P-8123 is preferably 85% or above. The spectral reflectivity within a wavelength range from 440 nm to 640 nm is preferably 85% or above, and difference between maximum and minimum spectral reflectivities observed within such wavelength range is preferably 5% or less. It is more preferable that the spectral reflectivity within a wavelength range from 400 nm to 700 nm is preferably 85% or above, and difference between maximum and minimum spectral reflectivities observed within such wavelength range is preferably 5 or less. As for the reflective image receiving material, the individual layers provided on the back side of the support are not necessarily be transparent and any color is allowable, where white color is preferred in terms of producing image also on the back side. The brightness and spectral reflectivity are again preferably 85% or above similarly to those for the right side.

The image receiving material for electronic photograph of the present invention preferably has an opacity as measured according to a method defined in JIS P-8138 of 85% or above, and more preferably 90% or above.

3) Toner Receiving Layer 3-1) Features of Toner Receiving Layer

The toner receiving layer composing the image receiving material for electronic photograph of the present invention comprises at least an acceptor substance which is capable of accepting toner for producing image transferred from a development drum or intermediate transfer medium with the aid of (static) electricity or pressure during the transfer process, and is capable of fixing the accepted toner with the aid of heat or pressure in fixation process. Examples of the acceptor substance include thermoplastic resin, water-soluble resin and other additives.

The thickness of the toner receiving layer is preferably half or more of the particle size of the toner, and more preferably one to three times the particle size of the toner. The toner receiving layer is preferably such that having the thickness disclosed in Japanese Laid-Open Patent Publication Nos. 5-216322 and 7-301939.

The toner receiving layer preferably satisfies one or more conditions listed below, more preferably two or more conditions, and most preferably all conditions:

(1) the toner receiving layer has a $T_g$ (glass transition point) of 30° C. or above, and more preferably (toner's $T_g$+20° C.) or below;

(2) the toner receiving layer has a $T_{1/2}$ (bisectoral softening point) of 60 to 150° C., and more preferably 80 to 120° C.;

(3) the toner receiving layer has a $T_{fb}$ (flow beginning temperature) of 40 to 100° C., and more preferably (toner's $T_{fb}$+10° C.) or below;

(4) the temperature whereat the toner receiving layer gains a viscosity of $1\times10^5$ mPa·s is lower by 40° C. or more than the temperature whereat the toner gains the viscosity of $1\times10^5$ mPa·s;

(5) the toner receiving layer has a storage elastic modulus (G') at the fixation temperature of $1\times10^2$ Pa to $1\times10^5$ Pa, and a loss elastic modulus (G") of $1\times10^2$ Pa to $1\times10^5$ Pa;

(6) the toner receiving layer has a loss tangent (G"/G') expressing a ratio of loss elastic modulus (G") and storage elastic modulus (G') at the fixation temperature of 0.01 to 10;

(7) the toner receiving layer has a storage elastic modulus (G') at the fixation temperature within a range from −50 to +2,500 relative to the storage elastic modulus (G") of the toner at the fixation temperature; and (8) the angle of inclination of the fused toner on the toner receiving layer is 50° or below, and more preferably 40° or below.

The toner receiving layer preferably satisfies physical properties such that being disclosed in Japanese Patent No. 2788358, Japanese Laid-Open Patent Publication Nos. 7-248637, 8-305067 and 10-239889.

The foregoing physical property (1) can be measured using a differential scanning calorimeter (DSC). The physical properties (2) to (4) can be measured using, for example, a flow tester CFT-500, product of Shimadzu Corporation. The physical properties (5) to (7) can be measured using a rotary rheometer (e.g., Dynamic Analyzer RADII, product of Rheometrix Corporation). The physical property (8) can be measured using a contact angle gauge, product of Kyowa Kaimen Kagaku K.K., according to a method described in Japanese Laid-Open Patent Publication No 8-334916.

3-2) Thermoplastic Resin

Any thermoplastic resin used for the toner receiving layer may be allowable provided that it can deform at the fixation temperature to thereby accept the toner. It is particularly preferable to use resins which belong to the same category with those used for binder contained in the toner. Since the toner often contains polyester resin, styrene-acrylate ester copolymer, styrene-methacrylate ester copolymer or the like, so that in such case the image receiving material for electronic photograph of the present invention preferably uses polyester resin, styrene-acrylate ester copolymer, styrene-methacrylate ester copolymer or the like as the thermoplastic resin, where it is particularly preferable to use polyester resin, styrene-acrylate ester copolymer, styrene-methacrylate ester copolymer or the like in an amount of 20 wt % or more. More specifically, the thermoplastic resins, which were described in the above for use in both sides of the base paper composing the support, are also applicable to the toner receiving layer. As for the thermoplastic resin used for the toner receiving layer, those satisfying physical properties disclosed, for example, in Japanese Examined Patent Publication Nos. 5-127413, 8-194394, 8-334915, 8-334916, 9-171265 and 10-221877 are preferably used.

The thermoplastic resin used for the toner receiving layer is preferably such that allowing such layer to satisfy the foregoing preferable conditions therefor after being included in such layer. In particular, it is preferable to choose thermoplastic resins capable of satisfying by themselves alone the foregoing preferable conditions for the toner receiving layer. It is also preferable to use in combination two or more resins differing in the foregoing physical properties.

The thermoplastic resin used for the toner receiving layer preferably has a molecular weight larger than that of the thermoplastic resin composing the toner. Such relation of molecular weight is, however, not always preferable depending on thermodynamic properties of the resins composing the toner and the toner receiving layer. For example, when the resin composing the toner receiving layer has a softening point higher than that of the resin composing the toner, it is sometimes preferable to almost equalize the molecular weights of the both, or to choose a smaller molecular weight for the resin composing the toner receiving layer.

The thermoplastic resin used for the toner receiving layer may also be a mixed resin comprising resins identical in the composition but different in the average molecular weight. The relation of the molecular weights of the thermoplastic resins composing the toner is preferably such that disclosed in Japanese Laid-Open Patent Publication No. 8-334915.

Distribution range of the molecular weight of the thermoplastic resin composing the toner receiving layer is preferably wider than that of the thermoplastic resin composing the toner.

3-3) Water-Soluble Resin

In the present invention, water-soluble polymer is available for the toner receiving layer. The water-soluble polymer is not specifically limited in terms of the composition, bond structure, molecular structure, molecular weight, molecular weight distribution and morphology thereof so far as it is soluble in water. Examples of possible functional groups responsible for ensuring water solubility include hydroxyl group, carboxyl group, amino group, amide group and ether group.

Typical water-soluble polymer can be found for example in Research Disclosure Vol. 17, No. 643, p. 26, ditto Vol. 18, No. 716, p. 651, ditto Vol. 307, No. 105, p. 873 to 874, and Japanese Laid-Open Patent Publication No. 64-13546, p. 71 to 75. More specifically, vinylpyrolidone-vinyl acetate copolymer, styrene-vinylpyrolidone copolymer, styrene-maleic anhydride copolymer, water-soluble polyester, water-soluble polyurethane, water-soluble nylon and water-soluble epoxy resin can preferably be used.

It is also allowable to properly select one or more water-soluble resin from the group consisting of water-dispersed resins such as water-dispersed acrylic resin, water-dispersed polyester resin, water-dispersed polystyrene resin and water-dispersed urethane resin; emulsions such as acrylic resin emulsion, polyvinyl acetate emulsion and SBR (styrene-butadiene rubber) emulsion; and copolymers, mixtures and cationic modified products thereof for independent use or combined use. Also gelatin is a possible material and can be selected from lime-treated gelatin, acid-treated gelatin and so-called delimed gelatin having a reduced content of calcium or so depending on purposes, where combined use thereof is also preferable.

For the case that a binder resin composing the toner is polyester resin, water-soluble polyesters are preferably used also for the toner receiving layer.

Such water-dispersed polyester resin is commercially available as Vylonal MD-1250 and MD-1930 produced by Toyobo Co., Ltd.; Pluscoat Z-446, Z-465 and RZ-96 produced by Goo Chemical Co., Ltd.; ES-611 and ES-670 produced by Dainippon Ink and Chemicals, Inc.; or Pesresin A-160P, A-210 and A-620 produced by Takamatsu Oil & Fat Co., Ltd.

The film forming temperature of the polymer employed herein is preferably the room temperature or higher in terms of the storability before printing, and 100° C. or lower in terms of the fixation of the toner particles.

3-4) Other Additives

Any layers containing the thermoplastic resin and composing the layers of image receiving material for electronic photograph of the present invention, various additives may be used to improve thermodynamic properties of such resin-containing layers. Additives suitable for such purposes include plasticizer, organic and inorganic filler, emulsion, dispersion and crosslinking agent.

3-4-1) Plasticizer

Any known plasticizers are available in the present invention. The plasticizer available in the present invention refers to a group of compounds responsible for controlling fluidization or softening of the toner receiving layer due to heat and/or pressure during the toner fixation.

The plasticizer can be selected referring to "Kagaku Binran (A Handbook of Chemistry)" (edited by The Chemical Society of Japan, published by Maruzen), "Kasozai-Sono Riron to Oyo-(Plasticizer-Principle and Applications-)" (edited and written by Takashi MURAI, published by Saiwai Shobo), "Kasozai no Kenkyu, Jo (Study on Plasticizers Vol. 1)", "Kasozai no Kenkyu, Ge (Study on Plasticizers Vol. 2)" (edited by Polymer Chemical Society) and "Binran; Gomu/Purasuchikku Haigou Yakuhin (A Handbook of Rubber/Plastic Blending Chemicals" (edited by Rubber Digest Corporation).

The plasticizer is also described under names of high-boiling-point organic solvent and hot solvent in Japanese Laid-Open Patent Publication Nos. 5-83154, 59-178451, 59-178453, 59-178454, 59-178455, 59-178457, 62-174754, 62-245253, 61-209444, 61-200538, 62-8145, 62-9348, 62-30247, 62-136646, 62-174754, 62-245253, 61-209444, 61-200538, 62-8145, 62-9348, 62-30247, 62-136646 and 2-235694, which is exemplified by esters (e.g., phthalic esters, phosphoric esters, aliphatic esters, abietic esters, adipic esters, sebacic esters, azelaic esters, benzoic esters, lactic esters, epoxy-modified aliphatic esters, glycolic esters, propionic esters, trimellitic esters, citric esters, sulfonic esters, calboxylic esters, succinic esters, maleic esters, fumaric esters, phthalic esters and stearic esters), amides (e.g., aliphatic amides and sulfonamides), ethers, alcohols, paraffins, polyolefinic waxes (e.g., polypropylene waxes, polyethylene waxes), lactones, polyethylene oxides, silicone oils and fluorine-containing compounds.

Polymers having relatively small molecular weight are also available as the plasticizer. The molecular weight of the plasticizer in such case is preferably smaller than that of the resin to be plasticized, and is preferably 15,000 or less, and more preferably 5,000 or less. It is also preferable to use polymer similar to the resin to be plasticized. For example, polyester is preferably used for plasticizing polyester resin. Oligomer is also beneficial as the plasticizer.

Besides the compounds enumerated in the above, other available commercial products include Adekacizer PN-170 and PN-1430 produced by Asahi Denka Kogyo K.K.; PARAPLEX-G-25, G-30 and G-40 produced by C. P. Hall Company; ester gum 8L-JA, Ester R-95, Pentalin 4851, FK115, 4820, 830, Louisol 28-JA, Picolastic A75, Picotex LC and Crystalex 3085 produced by Rika Hurculus Company.

3-4-2) Filler

In the present invention, any materials known as reinforcing material, whitening agent, filler and enforcing material can be used as the filler. The filler may be selected referring to "Binran; Gomu/Purasuchikku Haigou Yakuhin (A Handbook of Rubber/Plastic Blending Chemicals" (edited by Rubber Digest Corporation), "Shinpan: Purasuchikku Haigouzai; Kiso to Oyo "New Edition: Plastic Additives: Principle and Applications" (published by Taisei-sha) and "Firah Handobukku (Filler Handbook)" (published by Taisei-sha).

Various inorganic pigments can be used as the filler. Available inorganic pigments include titanium oxide, calcium carbonate, silica, talc, mica, alumina and any known materials listed in "Binran: Gomu/Purasuchikku Haigou Yakuhin (A Handbook of Rubber/Plastic Blending Chemicals" (edited by Rubber Digest Corporation).

3-4-3) Crosslinking Agent

In the present invention, compounds available as the crosslinking agent are such that having as reactive groups two or more functional groups within a single molecule, which can be selected from epoxy group, isocyanate group, aldehyde group, active halogen atom, active methylene group, acetylene group and other known reactive groups. Besides such compounds having functional groups capable of forming valence bond, it is also allowable to use compounds having two or more functional groups which are capable of forming the crosslink through hydrogen bond, ionic bond or coordinate bond.

It is still also allowable to employ known compounds generally used for resin, such as coupling agent, curing agent, polymerization agent, polymerization accelerator, solidification agent, filming aid and filming auxiliary. The coupling agent is exemplified by chlorosilanes, vinylsilanes, epoxysilanes, aminosilanes, alkoxyaluminumchelates, titanate coupling agent, and known compounds as listed in, for example, "Binran: Gomu/Purasuchikku Haigou Yakuhin (A Handbook of Rubber/Plastic Blending Chemicals" (edited by Rubber Digest Corporation).

3-4-4) Additives for Improving Electrostatic Property

The image receiving material for electronic photograph of the present invention preferably contains charge controlling agent in order to control transfer or adhesion of the toner, and to prevent electrostatic adhesion of the image receiving materials. The charge controlling agent may be any known antistatic agents or charge controlling agents, which are exemplified by surfactants such as cationic surfactant, anionic surfactant, amphoteric surfactant and nonionic surfactant; polymer electrolyte; and electro-conductive metal oxide.

Specific examples thereof include cationic antistatic agents such as quaternary ammonium salt, polyamine derivative, cation-modified polymethyl methacrylate and cation-modified polystyrene; anionic antistatic agents such as alkylphosphate and anionic polymer; and nonionic antistatic agents such as aliphatic ester and polyethylene oxide, while being not limited thereto.

For the case the toner has negative charge, the charge controlling agent is preferably cationic or nonionic ones.

Examples of the electro-conductive metal oxide include ZnO, $TiO_2$, $SnO_3$, $Al_2O_3$, $In_2O_3$, $SiO_2$, MgO, BaO and $MoO_3$. Such oxides may be used independently or in any combinations. It is also allowable to use composite oxide thereof. The metal oxide may further contain hetero-elements. For example, ZnO may be doped with Al, In, etc., $TiO_2$ with Nb, Ta, etc., and $SnO_2$ with Sb, Nb, halogen atom, etc.

4) Protective Layer

In the image receiving material for electronic photograph of the present invention, it is allowable to provide on the surface of the toner receiving layer a protective layer in order to ensure surface protection, improved storability, improved handling property, suitability for writing by hand, improved passing through instruments and anti-offset property. The protective layer may have a single-layered or multi-layered structure. Various kinds of thermoplastic resins, thermosetting resins and water-soluble polymers may be used as the binder, where those in the same category with those used for the toner receiving layer are preferably used. Thermodynamic properties and electrostatic properties are, however, not necessarily be same with those for the toner receiving layer, and can individually be optimized.

Any additives available for the toner receiving layer are available also for the protective layer. In particular for the protective layer, those preferably used relate to charge controlling agent, matting agent, slipping aid and mold release agent. It should now be noted that additives described below are also applicable to the layers other than the protective layer.

The outermost layer (surface protective layer, for example) of the image receiving material for electronic photograph of the present invention preferably has a desirable compatibility with the toner in terms of fixation property. More specifically, the layer preferably has a contact angle with the fused toner of 0 to 40°.

4-1) Matting Agent

Any known matting agent may be applied for the image receiving material for electronic photograph of the present invention. Solid particles available as the matting agent are classified into inorganic particles and organic particles. Examples or source materials for the inorganic matting agent include oxides (e.g., silicon dioxide, titanium oxide, magnesium oxide, aluminum oxide), alkaline earth metal salts (e.g., barium sulfate, calcium carbonate, magnesium sulfate), silver halides (e.g., silver chloride, silver bromide), and glass.

Examples of source materials for the organic matting agent include starch, cellulosic ester (e.g., cellulose acetate propionate), cellulosic ether (e.g., ethyl cellulose) and synthetic resin. The synthetic resin is preferably insoluble or poorly soluble in water. Examples of such water-insoluble or poorly water-soluble synthetic resin include poly(meth) acrylic ester (e.g., polyalkyl (meth)acrylate, polyalkoxyalkyl (meth)acrylate, polyglycidyl (meth)acrylate), poly(meth) acrylamide, polyvinyl ester (e.g., polyvinyl acetate), polyacrylonitrile, polyolefin (e.g., polyethylene), polystyrene, benzoguanamine resin, formaldehyde condensed polymer, epoxy resin, polyamide, polycarbonate, phenol resin, polyvinylcarbazole and polyvinylidene chloride. Using copolymers in which the above repetitive units are combined is also allowable.

4-2) Slipping Aid

It is desirable that the image receiving material for electronic photograph of the present invention does not adhere to a fixation heating member during the fixation. The 180° peel strength on the fixation heating member at the fixation temperature is preferably 0.1 N/25 mm or below, and more preferably 0.041 N/25 mm or below. The 180° peel strength can be measured using the surface material of the fixation area in compliance with a method described in JIS K-6887.

Various known slipping aids are applicable to the image receiving material for electronic photograph of the present invention, and examples thereof include sodium higher-alkylsulfate, higher aliphatic acid higher alcohol ester, Carbowax, higher alkyl phosphate ester, silicone compound, modified silicone and hardening silicone Other preferable candidates include polyolefinic wax, fluorine-containing oil, fluorine-containing wax, carnauba wax, microcrystalline wax and silane compounds.

5) Back Layer

The image receiving material for electronic photograph of the present invention is characterized in that the back side thereof can ensure excellent printing quality both for electronic photographic image and ink-jet printed image. The back side is in particular excellent in printing suitability with ink-jet printer (more specifically, drying property, waterproof property and sharpness of printed image). To form the back layer having such properties, at least one toner receiving layer is formed as the back layer. While the toner receiving layer on the back side may be identical to that formed on the right side, it is not fully suitable for ink-jet printing as it is, so that the foregoing thermoplastic resin (preferably that in a particle form), porous particles and a cationic material are used as accepting materials. These components may be included in the same layer or may be included in separate layers.

The foregoing matting agent, slipping aid and charge controlling agent can be used also in the toner receiving layer and the upper adjacent layer thereof on the back side similarly to the layers on the right side.

5-1) Porous Particles

Porous particles are used in the toner receiving layer on the back side in order to ensure ink absorption property and drying property. More specifically, besides inorganic particles generally contained in image receiving paper for ink-jet printing, organic particles or polymer particles are available.

The porous particles are preferably contained in the same layer with the foregoing thermoplastic resin particles. The compositional ratio of which is determined considering a best balance between ink drying property and toner fixation property. An overall amount of coating preferably ranges from 1 $g/m^2$ to 30 $g/m^2$, and more preferably 5 $g/m^2$ to 20 $g/m^2$.

Any known porous inorganic particles are available. Examples of the porous inorganic particles available in the present invention include precipitated calcium carbonate, heavy calcium carbonate, kaolin, talc, calcium sulfate, barium sulfate, titanium dioxide, magnesium oxide, zinc oxide, satin white, aluminum silicate, diatom earth, calcium silicate, magnesium silicate, synthetic amorphous silica, colloidal silica, colloidal alumina, pseudo-boehmite, aluminum hydroxide, alumina, lithopone, zeolite, hydro-halloysite, magnesium carbonate, magnesium hydroxide, silica-boria and silica magnesium, while being not limited thereto.

From the viewpoint of achieving gloss, the average particle size of such particles is preferably 300 nm or below, and more preferably 100 nm or below.

From the viewpoint of forming a porous layer to the image receiving material for electronic photograph of the present invention, inorganic particles capable of producing a void structure as bulky as possible are most preferably used, so that silica particles and/or alumina particles are preferable. The organic or polymer particles can be synthesized typically according to emulsion polymerization process using monomer components listed below or mixtures thereof, while the available monomer component are by no means limited thereto. The average particle size thereof is preferably 500 nm or below in the present invention.

Specific examples of the monomer include acrylic ester or methacrylic esters such as methyl (meth)acrylate, ethyl (meth)acrylate, isopropyl (meth)acrylate, n-butyl (meth) acrylate, isobutyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth) acrylate, dodecyl (meth)acrylate, octadecyl (meth)acrylate, cyclohexyl (meth)acrylate, phenyl (meth)acrylate, benzyl (meth)acrylate, 2-hydroxyethyl (meth)acrylate, hydroxypropyl (meth)acrylate and glycidyl (meth)acrylate; vinyl esters such as vinyl acetate; acrylonitrile, methacrylonitriles and analogues thereof; aromatic vinyl compounds such as styrene, 2-methylstyrene, vinyltoluene, tert-butylstyrene, chlorostyrene, vinylanisole, vinylnaphthalene and divinylbenzene; halogenated vinylidenes such as vinylidene chloride and vinylidene fluoride; ethylene, propylene, isopropylene butadiene, vinylpyrolidone, vinyl chloride, vinyl ether, vinyl ketone, chloroprene or the like; carboxyl-group-containing, ethylene-base unsaturated carboxylic acids such acrylic acid, methacrylic acid, maleic acid and monoalkyl ester thereof, itaconic acid and monoalkyl ester thereof, and fumaric acid and monoalkyl ester thereof; amido-group-containing acrylamide and N,N-dimethylacrylamide or the like; amino-group-containing alkylaminoesters of acrylic acid or methacrylic acid such as N-methylaminoethyl methacrylate, N-methylaminoethyl acrylate, dimethylaminoethyl methacrylate, dimethylaminoethyl acrylate, diethylaminoethyl methacrylate, diethylaminoethyl acrylate; monovinylpyridines such as formed between vinylpyridine and unsaturated amides having an alkylamino group such as N-(2-dimethylaminoethyl)acrylamide, N-(2-dimethylaminoethyl)methacrylamide, and N,N-dimetylaminopropylacrylamide; vinyl ethers having an alkylamino group such as dimethylaminoethylvinyl ether; vinyl imidazole or the like; compounds having sulfonic acid group such as vinyl sulfonic acid, styrene sulfonic acid or salt thereof, and 2-acryloylamino-2-methylpropane sulfonic acid or salt thereof. Such monomers may be used independently or in combination of two or more thereof. Either of simple particle structure and core-shell structure is allowable to the polymer particles.

Also self-crosslinking polymer particles having an ionic functional group as described in Japanese Laid-Open Patent Publication No. 11-138982 are available. In such case, properly selecting a cationic material will successfully improve the drying property and water-proof property of the ink, since only small amounts of use of cationic material, described next, and polymer crosslinking agent suffice.

5-2) Cationic Material

When the back side is ink-jet printed, the porous particles contained in the toner receiving layer on the back side will be responsible for improved drying property of the printed image since the porous particles can absorb the ink. Simply using such porous particles are, however, not successful in preventing blurring of the printed image per se, and ink flow caused by contact with water drop. To suppress such blurring or ink flow, the cationic material is included in the toner receiving layer or coated thereon.

The amount of coating of the cationic material preferably ranges from 0.1 $g/m^2$ to 15 $g/m^2$, and more preferably 0.5 $g/m^2$ to 8 $g/m^2$.

The cationic material can arbitrarily be selected among mordants which are generally used, among which polymer mordant is particularly preferable. The polymer mordant herein typically include polymers containing tertiary amino group, polymer having nitrogen-containing heterocyclic portion, and polymers containing quaternary cationic group.

Preferable specific examples of homopolymers and copolymers containing vinyl monomer units having tertiary imidazole groups include those listed below, where numerals shown nearby the monomer units represent molar percent (the same will apply hereinafter).

(1)

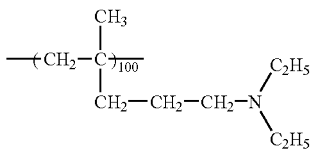

(2)

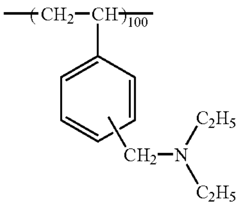

(3)

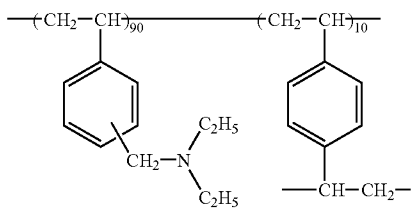

Specific examples of homopolymers and copolymers including vinyl monomer units having tertiary imidazole groups can be exemplified by mordants disclosed typically in U.S. Pat. Nos. 4,282,305, 4,115,124 and 3,148,061, Japanese Laid-Open Patent Publication Nos. 60-118834, 60-122941, 62-244043, and 62-244036.

(4)
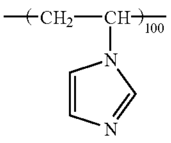
(5)
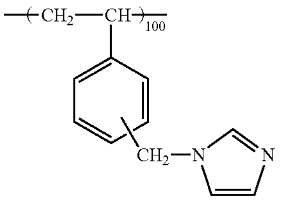
(6)
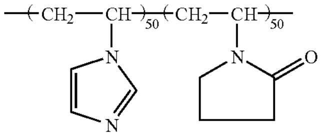
(7)
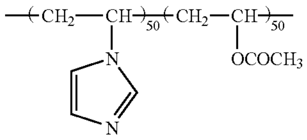
(8)
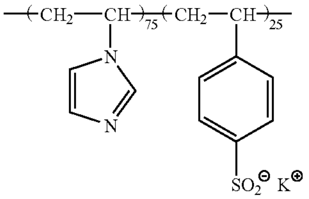
(9)
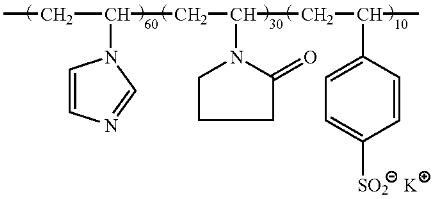
(10)
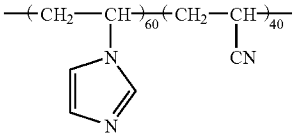
(11)
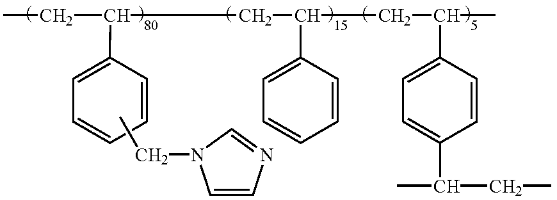
-continued
(12)
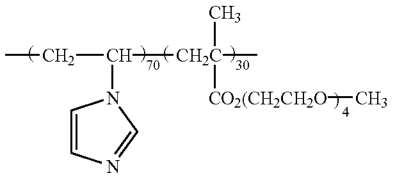
(13)
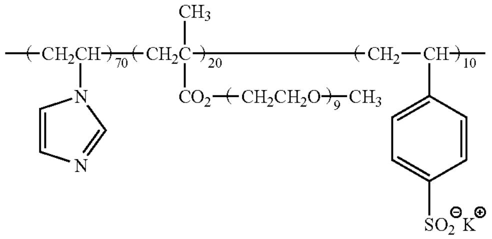
(14)
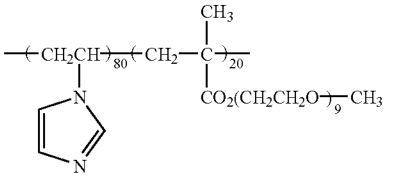
(15)
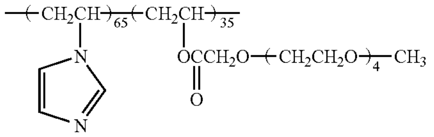
(16)
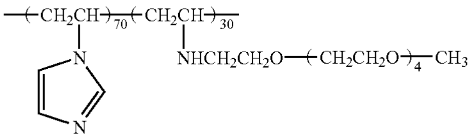
(17)
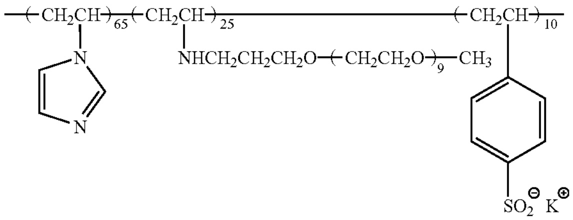
Preferable examples of homopolymer and copolymer containing vinyl monomer unit having quaternary imidazolium salt can be exemplified by mordants disclosed typically in British Patents Nos. 2,056,101, 2,093,041 and 1,594,961, U.S. Pat. Nos. 4,124,386, 4,115,124, 4,273,853, 4,450,224 and Japanese Laid-Open Patent Publication No. 48-28325, and compounds listed below.

(18)

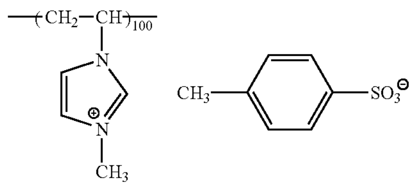

(19)

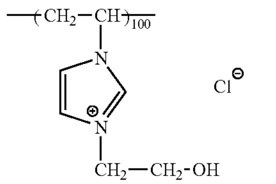

(20)

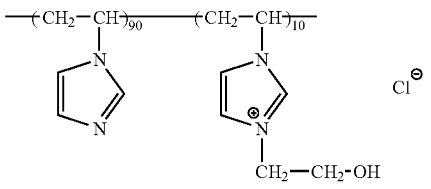

(21)

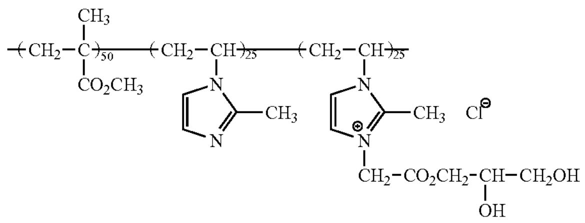

(22)

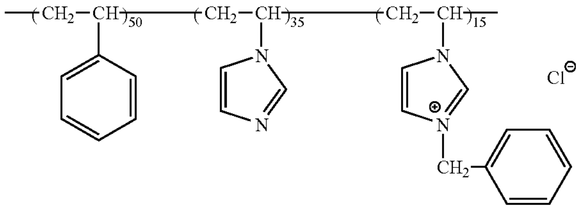

Other preferable examples of homopolymer and copolymer containing vinyl monomer unit having quaternary ammonium salt can be exemplified by mordants disclosed in U.S. Pat. Nos. 3,709,690, 3,898,088 and 3,958,995, Japanese Laid-Open Patent Publication Nos. 60-57836, 60-60643, 60-122940, 60-122942 and 60-235134, and compounds listed below.

(23)

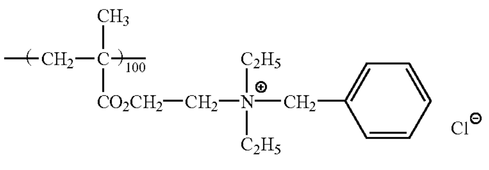

-continued (24)

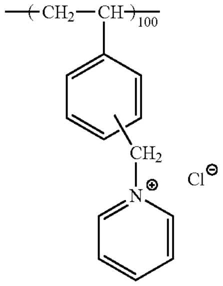

(25)

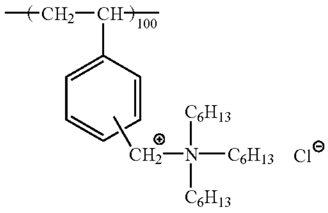

(26)

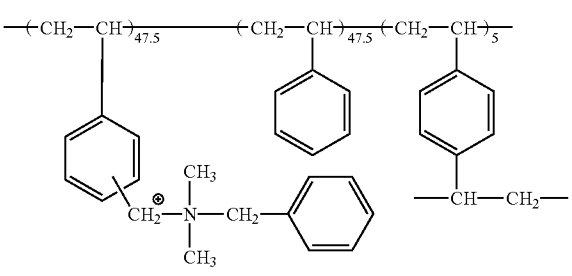

(27)

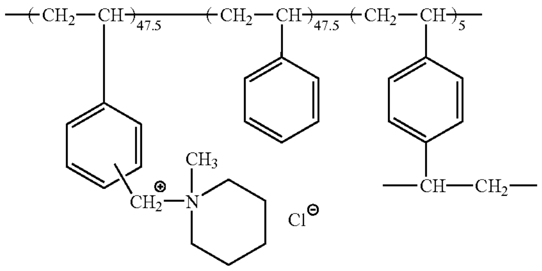

(28)

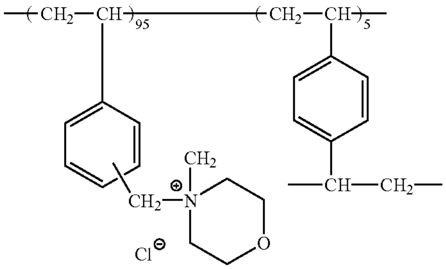

Still other preferable mordants include vinylpyridine polymer and vinylpyridinium cation polymer as typically disclosed in U.S. Pat. Nos. 2,548,564, 2,484,430, 3,148,161 and 3,756,814; polymer mordants capable of crosslinking with gelatin or so typically disclosed in U.S. Pat. Nos. 3,625,694, 3,859,096 and 4,128,538 and British Patent No. 1,277,453; water-base sol mordants typically disclosed in U.S. Pat. Nos. 3,958,995, 2,721,852 and 2,798,063, Japanese Laid-Open Patent Publication Nos. 54-115228, 54-145529 and 54-26027; water-insoluble mordants disclosed in U.S. Pat. No. 3,898,088; reactive mordants capable of forming valence bond with dyes typically disclosed in U.S. Pat. No. 4,168,976 (Japanese Laid-Open Patent Publication No-54-137333); and other mordants disclosed in U.S. Pat. Nos. 3,709,690, 3,788,855, 3,642,482, 3,488,706, 3,557,066, 3,271,147 and 3,271,148, Japanese Laid-Open Patent Publication Nos. 50-71332, 53-30328, 52-155528, 53-125 and 53-1024.

Still again other preferable mordants include those disclosed in U.S. Pat. Nos. 2,675,316 and 2,882,156.

The molecular weight of the polymer mordant used in the present invention preferably ranges from 1,000 to 1,000,000, and more preferably from 10,000 to 200,000.

Besides cationic resins mentioned above, trimetyl-type cationic materials, dialkyl-type cationic materials, benzyl-type cationic materials, amine salt-type cationic materials and imidazoline-type cationic materials and others can be used in the present invention.

Examples of the trimetyl-type cationic materials include octadecyltrimethylammonium chloride, alkyl (tallow) trimethylammonium chloride, dodecyltrimethylammonium chloride, alkyl(palm oil)trimethylammonium chloride, hexadecyltrimethylammonium chloride, behenyltrimethylammonium chloride, quaternary salt of alkyl(tallow)imidazoline.

Examples of the benzyl-type cationic materials include alkyl(palm oil)dimethylbenzylammonium chloride, tetradecyldimethylbenzylammonium chloride, octadecyldimethylbenzylammonium chloride.

Examples of amine salt-type cationic materials include octadecylamine acetate, tetradecylamine acetate, tallow alkyl propylenediamine acetate.

Examples of imidazoline-type cationic materials include quaternary salt of 1-hydroxyethyl-2-alkyl(tallow)imidazoline.

As other cationic materials, specific cationic surface active agents such as dioleyldimethylammonium chloride and polyoxyethylenedodecylmonomethylammonium chloride, and alkyl(palm oil)isoquinolinium bromide can be used in the present invention.

5-3) Binder

Next the binder used for the toner receiving layer provided on the back side will be described.

While there is no specific limitation on the binder used for immobilizing the mixture of the thermoplastic resin particles and porous particles onto the support, water-soluble polymer and/or latex dispersion are preferably used. Specific examples of the binder include starch derivatives such as oxidized starch, ether-modified starch and phosphate ester-modified starch; cellulose derivatives such as carboxymethyl cellulose and hydroxyethyl cellulose; casein, gelatin, soy bean protein, polyvinyl alcohol and derivatives thereof; conjugated diene-base copolymer latex such as polyvinylpyrolidone, maleic anhydride resin, styrene-buta-diene copolymer, methylmethacrylate-butadiene copolymer; acrylic polymer latex such as polymers or copolymers of acrylate or methacrylate; vinyl-base polymer latex such as ethylene-vinyl acetate copolymer; or functional group-modified polymer latex of such polymers with the aid of carboxyl group- or other functional group-containing monomers; water-base adhesive containing thermosetting resin such as melamine resin, or urea resin; acrylate such as polymethylmethacrylate; polymer or copolymer of methacrylate; and synthetic resin-base adhesive such as those containing polyurethane resin, unsaturated polyester resin, vinyl chloride-vinyl acetate copolymer, polyvinylbutyral, or alkyd-resin.

The amount of use of the binder is preferably 100 wt % or less of the total particles considering the ink absorption property, and more preferably 30 wt % or less.

In the present invention, it is also preferable to use film hardening agent suitable for the above binder in order to improve the water-proof property of the porous layer. There is no specific limitation on the film hardening agent and any known film hardening agent such as those of aldehyde base, aziridine base, isooxazole base, epoxy base, vinylsulfone base, acryloyl base, carbodiimide base and triazine base are available. Polymer film hardening agents having the foregoing reactive group are also available.

6) Other Materials

For the image receiving material for electronic photograph of the present invention, various known photographic additives other than those described in the above may be used depending on purpose or mode of the use. The photographic additives are described for example in Research Disclosure (abbreviated as "RD" hereinafter) No. 1/643 (December, 1978), No. 18716 (November, 1979) and No. 307105 (November, 1989), where relevant pages thereof were summarized in Table 1.

TABLE 1

| Additives | RD17643 | RD18716 | RD307105 |
|---|---|---|---|
| Brightener | p. 24 | p. 648, right | p. 868 |
| Stabilizer | p. 24–25 | p. 649, right | p. 868–870 |
| Light absorbing agent, UV absorbing agent | p. 25–26 | p. 649, right | p. 873 |
| Pigment image stabilizer | p. 25 | p. 650, right | p. 872 |
| Film hardening agent | p. 26 | p. 651, left | p. 874–875 |
| Binder | p. 26 | p. 651. left | p. 873–874 |
| Plasticizer, lubricant | p. 27 | p. 650, right | p. 876 |
| Coating aid, surfactant | p. 26–27 | p. 650. right | p. 875–876 |
| Antistatic agent | p. 27 | p. 650. right | p. 876–877 |
| Matting agent | — | — | p. 878–879 |

Features of the present invention will now be more specifically described referring to Examples and Comparative Examples. Materials, amount of use thereof, ratio of use, operations, procedures or the like can properly be modified without departing from the spirit of the present invention. Thus it is to be understood that the present invention is by no means limited to the specific examples explained below. In the following Examples and Comparative Examples, notation "%" always represents "wt %".

EXAMPLE 1

<Support>

A wood-free paper internally added with water-dispersed, anatase-type titanium dioxide in a content of 1.1 $g/m^2$ (basis weight of pulp: 160 $g/m^2$) was used as a base paper, and on the back side of which high-density polyethylene (MI=10 g/10 minutes, density=0.950 $g/cm^3$) containing 1.5 $g/m^2$ of rutile-type titanium dioxide was extruded by the extrusion coating method (310° C.), to thereby form a polyethylene layer of 15 μm thick.

Next, on the right side of such wood-free paper, an 1:1 (weight basis) blended material of high-density polyethylene (MI=8 g/10 minutes, density=0.950 $g/cm^3$) and low-density polyethylene (MI=7 g/10 minutes, density=0.923 $g/cm^3$) containing 3.0 $g/m^2$ of anatase-type titanium dioxide was similarly extruded by the extrusion coating method, to thereby form a right side polyethylene layer of 13 μm thick.

The polyethylene layers on both sides of the support were subjected to corona discharge treatment, and a composition for an undercoat layer was then coated using a wire coater so as to attain a thickness after drying of 0.1 μm, which was followed by drying to thereby form the right side undercoat layer.

| <<Composition for Undercoat Layer>> | |
|---|---|
| gelatin | 5 g |
| water | 95 g |

<Single-Sided Image Receiving Material>

On the foregoing undercoat layer on the right side, a composition "A" or composition "B" for the toner receiving layer shown below was coated using a wire coater so as to attain an amount of coating after drying of 7.5 g /m$^2$, and then dried to thereby produce a sheet-type, single-sided image receiving material "A" or "B".

| <<Composition "A" for Toner Receiving Layer>> | |
|---|---|
| polyester resin (product of Kao Corporation, Tuftone U-5) | 100 g |
| silicon-base compound (Shin-etsu Chemical Co., Ltd., FL-100) | 1 g |
| triphenyl phosphate | 9 g |
| titanium dioxide (product of Ishihara Sangyo K.K., Tipaque @ A-220) | 15 g |
| methyl ethyl ketone | 160 g |
| **<<Composition "B" for Toner Receiving Layer>>** | |
| water-dispersed polyester resin (product of Unitika Ltd., KZA-7049) | 100 g |
| silicone emulsion (product of Toray Silicone Co., Ltd., SH-7028) | 1 g |
| titanium dioxide (product of Ishihara Sangyo K.K., Tipaque @ A-220) | 0.9 g |
| methanol | 30 g |
| water | 10 g |

<Double-Sided Image Receiving Material>

On the back sides of such image receiving materials "A" and "B", a composition-1 was coated using a wire coater so as to attain an amount of coating after drying of 12 g/m$^2$, the paint films were dried, and further thereon an aqueous cationic resin solution (product of Asahi Denka Kogyo K.K., Adeka Catioace PD-50) was over-coated in an amount of coating on the solid basis of 1 g/m$^2$, to thereby produce sheet-type, double-sided image receiving materials "A-1" and "B-1", respectively.

| <<Composition for Back Layer-1>> | |
|---|---|
| polyester resin dispersion (product of Toyobo Co., Ltd., Vylonal MD-1200, 34% dispersion) | 100 g |
| porous silica (product of Fuji Silysia Chemical Ltd., Sylysia) | 28 g |
| matting agent (Nippon Shokubai Co., Ltd., Epostar L15) | 12 g |
| water | 250 g |

EXAMPLE 2

On the individual back sides of the single-sided image receiving materials "A" and "B" produced in Example 1, a composition for back layer-2 shown below was coated using a wire coater so as to attain an amount of coating after drying of 12 g/m$^2$, to thereby produce double-sided image receiving materials "A-2" and "B-2", respectively.

| <<Composition for Back Layer-2>> | |
|---|---|
| polyester resin dispersion (product of Takamatsu Oil & Fat Co., Ltd., Pesresin A-515GB, 30% dispersion) | 100 g |
| porous silica (product of Fuji Silysia Chemical Ltd., Sylysia) | 28 g |
| polyvinylimidazole-base compounds (a 25% aqueous solution of (9)) | 24 g |
| matting agent(Nippon Shokubai Co., Ltd., Epostar US) | 12 g |
| water | 226 g |

EXAMPLE 3

On the individual back sides of the single-sided image receiving materials "A" and "B" produced in Example 1, the Composition for back layer-l described in Example 1 was coated using a wire coater so as to attain an amount of coating after drying or 12 g/m$^2$, and further thereon a cationic acrylic resin (product of Mitsubishi Chemical Corporation, Saftomer ST-3300:40%) was over-coated in an amount of coating on the solid basis of 1 g/m$^2$, to thereby produce double-sided image receiving materials "A-3" and "B-3", respectively.

EXAMPLE 4

Double-sided image receiving materials "A-4" and "B-4" were produced similarly to Example 1, except that the composition for the back layer-l containing 60 g of porous polymer particles (Zeon Corporation, Nipol CMH5055, 30% solution) in place of porous silica was coated on the individual back sides of the single-sided image receiving materials "A" and "B" produced in Example 1.

COMPARATIVE EXAMPLE 1

On the individual back sides or the single-sided image receiving materials "A" and "B" produced in Example 1, the composition for the back layer-l was coated so as to attain an amount of coating after drying of 12 g/m$^2$, to thereby produce double-sided image receiving materials "A-5" and "B-5".

COMPARATIVE EXAMPLE 2

On the individual back sides of the single-sided image receiving materials "A" and "B" produced in Example 1, a composition for back layer-3 listed below was similarly coated so as to attain an amount of coating after drying of approx. 12 g/m$^2$, to thereby produce double-sided image receiving materials "A-6" and "B-6".

| <<Composition for Back Layer-3>> | |
|---|---|
| modified polyvinyl alcohol (product of Kuraray Co., Ltd., PVA R-1130, 10% aqueous solution) | 150 g |
| porous silica (product of Fuji Silysia Chemical Ltd., Sylysia) | 50 g |
| polyvinylimidazole compound (25% aqueous solution of "9") | 24 g |
| matting agent (Nippon Shokubai Co., Ltd., Epostar US) | 12 g |
| water | 154 g |

TEST EXAMPLES

The individual image receiving materials produced in the Examples and Comparative Examples were cut into A4 size (210.0 mm×297.0 mm), loaded On a full-color laser printer (product of Fuji Xerox Co., Ltd., DocuColor 1250CP) or a color laser printer (product of Fuji Xerox Co., Ltd., DocuPrint C-620), and subjected to printing of patterns in white, black, gray, three colors or RGB and three colors of YMC, and a portrait image of a woman, which successfully resulted in glossy printed image with full of photographic touch. Also the back side was subjected to the same printing, which results in similar glossy image.

Next, the individual image receiving materials produced in the Examples and Comparative Examples were cut into postcard size, and on the back side thereof the patterns similar as described in the above were printed using an ink-jet printer (product of Seiko Epson Corporation, EPSON PM800C) to assess the drying property and water-proof property of the ink, and blurring of the printed image. The drying property was assessed based on severity of dirt on white background produced by rubbing the black and three-colored patterns with a finger immediately after the printing. The water-proof property was assessed by observing severity of blurring of the printed image, which was caused by dropping water droplets onto the printed image after being allowed to stand for a day after the printing. The blurring of the image was assessed by observing blurring around printed characters after being allowed to stand for a day.

The image receiving material for electronic photograph produced in Examples and Comparative Examples were cut into postcard size, and on the back side thereof the patterns similar as described in the above were printed using a color laser printer (product of Fuji Xerox Co., Ltd., DocuPrint C-620) to assess the toner fixation property. The toner fixation property was assessed by placing an adhesive tape (product of 3M, Scotch Brand Tape) on the printed image, and observing the status of such image after the tape was peeled off.

The results were assessed according to three levels below:

○: satisfactory;

Δ: almost satisfactory; and x: not satisfactory.

TABLE 2

| | | Ink-jet printed image | | | Electronic photographic image |
|---|---|---|---|---|---|
| Image receiving material | Printing on back side | Drying property | Water-proof property | Blurring in image | Toner fixation property |
| Example | A-1 | ○ | ○ | ○ | ○ |
| | B-1 | ○ | ○ | ○ | ○ |
| | A-2 | ○ | Δ | ○ | ○ |
| | B-2 | ○ | Δ | ○ | ○ |
| | A-3 | ○ | ○ | ○ | ○ |
| | B-3 | ○ | ○ | ○ | ○ |
| | A-4 | ○ | ○ | ○ | ○ |
| | B-4 | ○ | ○ | ○ | ○ |
| Comparative Example | A-5 | Δ | × | × | ○ |
| | B-5 | Δ | × | × | ○ |
| | A-6 | ○ | Δ | ○ | × |
| | B-6 | ○ | Δ | ○ | × |

The image receiving material for electronic photograph of the present invention allows printing on the right side thereof electronic photographic images excellent in glossiness and photographic touch, and printing on the back side thereof either of electronic photographic image and ink-jet printed image. In particular, the material is excellent in printing suitability (more specifically, drying property, water-proof property and sharpness of printed image) on the back side. The image receiving material for electronic photograph of the present invention is extremely beneficial for the purpose of duplex printing such as intended for postcards.

What is claimed is:

1. An image receiving material for electronic photograph comprising:

a support made of base paper having a polyolefin resin layer on each side of the support;

a toner receiving layer, provided on one side of said support, which contains a thermoplastic resin; and one or more back layers provided on the other side of said support, wherein thermoplastic resin particles, porous particles and a cationic material selected from the group consisting of polymer mordants, trimethyl-type cationic materials, dialkyl-type cationic materials, benzyl-type cationic materials, amine salt-type cationic materials and imidazoline-type cationic materials are contained in any one of said back layers.

2. The image receiving material as claimed in claim 1, wherein said porous particles are inorganic particles and/or polymer particles.

3. The image receiving material as claimed in claim 1, which has a back layer containing the porous particles and the thermoplastic resin together.

4. The image receiving material as claimed in claim 1, wherein the content of said porous particles in the back layer is within a range from 1 $g/m^2$ to 30 $g/m^2$.

5. The image receiving material as claimed in claim 4, wherein the content of said porous particles in the back layer is within a range from 5 $g/m^2$ to 20 $g/m^2$.

6. The image receiving material as claimed in claim 1, wherein said porous particles have an average particle size of 300 nm or below.

7. The image receiving material as claimed in claim 6, wherein said porous particles have an average particle size of 100 nm or below.

8. The image receiving material as claimed in claim 1, wherein said porous particles are silica particles and/or alumina particles.

9. The image receiving material as claimed in claim 2, wherein said polymer particles have an average particle size of 500 nm or below.

10. The image receiving material as claimed in claim 2, wherein said polymer particles are self-crosslinking polymer particles having cationic groups.

11. The image receiving material as claimed in claim 1, wherein said cationic material is a cationic resin.

12. The image receiving material as claimed in claim 1, wherein the content of said cationic material in the back layer is within a range from 0.1 $g/m^2$ to 15 $g/m^2$.

13. The image receiving material as claimed in claim 12, wherein the content of said cationic material in the back layer is within a range from 0.5 $g/m^2$ to 8 $g/m^2$.

14. The image receiving material as claimed in claim 1, wherein said cationic material is a polymer mordant.

15. The image receiving material as claimed in claim 14, wherein said polymer mordant is selected from the group consisting of a mordant polymer containing tertiary amino group, a mordant polymer having nitrogen-containing heterocyclic portion, and a mordant polymer containing quaternary cationic group.

16. The image receiving material as claimed in claim 1, wherein said back layers are formed using a water-soluble polymer and/or latex dispersion.

17. The image receiving material as claimed in claim 1, wherein said back layer contains a binder in an amount of 100 wt % or less of total particles contained therein.

18. The image receiving material as claimed in claim 17, wherein said back layer contains a binder in an amount of 30 wt % or less of total particles contained therein.

19. The image receiving material as claimed in claim 1, wherein said back layer contains a film hardening agent for the binder.

20. The image receiving material as claimed in claim 1, wherein said back layer contains a matting agent, a slipping aid and/or a charge controlling agent.

21. An image receiving material for electronic photograph comprising:

a support made of base paper having a polyolefin resin layer on each side of the support;

a toner receiving layer, provided on one side of said support, which contains a thermoplastic resin; and one or more back layers provided on the other side of said support, wherein thermoplastic resin particles, porous particles and a cationic material are contained in any one of said back layers, and wherein the content of said porous particles in the back layer is within a range from 5 $g/m^2$ to 20 $g/m^2$.

* * * * *